(12) United States Patent
Sonoda et al.

(10) Patent No.: US 7,298,440 B2
(45) Date of Patent: Nov. 20, 2007

(54) SEMI-TRANSMISSIVE HOMEOTROPIC LIQUID CRYSTAL DISPLAY DEVICE

(75) Inventors: Tooru Sonoda, Nara (JP); Kenji Fujita, Toyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 148 days.

(21) Appl. No.: 10/994,894

(22) Filed: Nov. 23, 2004

(65) Prior Publication Data
US 2005/0110928 A1 May 26, 2005

(30) Foreign Application Priority Data
Nov. 25, 2003 (JP) ............................. 2003-393651
Oct. 6, 2004 (JP) ............................. 2004-294183

(51) Int. Cl.
*G02F 1/1335* (2006.01)
*G02F 1/1337* (2006.01)

(52) U.S. Cl. ...................... 349/114; 349/113; 349/130

(58) Field of Classification Search ................ 349/114, 349/113, 130
See application file for complete search history.

(56) References Cited

U.S. PATENT DOCUMENTS

| | | | |
|---|---|---|---|
| 6,452,654 B2* | 9/2002 | Kubo et al. | 349/114 |
| 6,507,381 B1* | 1/2003 | Katsuya et al. | 349/130 |
| 6,819,379 B2* | 11/2004 | Kubo et al. | 349/114 |
| 6,900,863 B2* | 5/2005 | Okamoto et al. | 349/114 |
| 2003/0151709 A1* | 8/2003 | Sakamoto | 349/113 |

FOREIGN PATENT DOCUMENTS

| | | |
|---|---|---|
| JP | 10-206845 | 8/1998 |
| JP | 11-101992 | 4/1999 |
| JP | 2000-305110 | 11/2000 |
| JP | 2003-57639 | 2/2003 |
| JP | 2003-167253 | 6/2003 |
| JP | 2003-315766 | 11/2003 |
| KR | 10-2001-0025955 A | 4/2001 |

* cited by examiner

*Primary Examiner*—Huyen Ngo
(74) *Attorney, Agent, or Firm*—Nixon & Vanderhye P.C.

(57) ABSTRACT

A semitransmissive hometropic liquid crystal display device includes: an active matrix substrate; a counter substrate; a liquid crystal layer interposed between the substrates; and a plurality of pixels. Each pixel is comprised of a reflection section (that performs display in a reflection mode) and a transmission section (that performs display in a transmission mode). The liquid crystal display device further includes an electrode covering (13, 14) configured whereby voltage applied to the liquid crystal layer in the reflection section approximates the voltage applied to the transmission section. The electrode covering film (13, 14) comprises a transparent conductive film which functions as applied voltage adjusting means by compensating for a difference in a work function between the reflecting electrode (5) and the transparent electrode (6).

15 Claims, 7 Drawing Sheets

SEMI-TRANSMISSIVE HOMEOTROPIC LIQUID CRYSTAL DISPLAY DEVICE

CROSS REFERENCE TO RELATED APPLICATIONS

This Non-provisional application claims priority under 35 U.S.C. § 119(a) on Patent Application No. 2003-39365 filed in Japan on Nov. 25, 2003, and Patent Application No. 2004-294183 filed in Japan on Oct. 6, 2004, the entire contents of which are hereby incorporated by reference.

BACKGROUND OF THE INVENTION

1. Field of the Invention

The present invention relates to a liquid crystal display device capable of reflective type display and transmissive type display, and particularly relates to a liquid crystal display device in which liquid crystal molecules are oriented perpendicular to the plane of a substrate when no voltage is applied.

2. Description of the Prior Art

Recently, liquid crystal display devices are applied to various display devices such as portable personal data assistants (PDA), mobile phones, portable video games, car navigation systems and the like.

Such outdoor devices, which have inherent characteristics of compactness and light weight, are required to have further characteristics of low power consumption and excellent viewability (high contrast). In this association, semi transmissive type liquid crystal display devices of which excellent indoor and outdoor viewabilities are expected have been proposed (e.g., Japanese Patent Application Laid Open Publication No. 11-101992A).

This semi transmissive type liquid crystal display device includes a reflection section comprised of an electrode (reflecting electrode) having high reflectance in each pixel, which is a minimum unit of an image, and a transmission section comprised of an electrode (transparent electrode) having high transmittance, and performs display in a transmission mode where the transmission section transmits light of a backlight indoors while performing display in a reflection mode where the reflection section reflects external light outdoors. Accordingly, the semi transmissive type liquid crystal display device maintains sufficient contrast indoors and outdoors, thereby exhibiting excellent viewablity.

Figure 7:
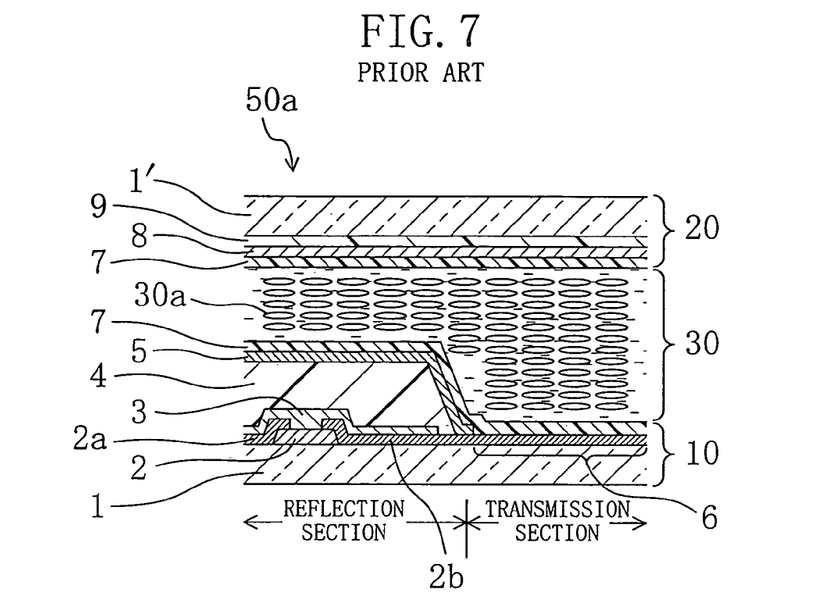
FIG. 7 is a schematic section of a conventional semi transmissive type liquid crystal display device of homogeneous orientation type.
Figure 8:
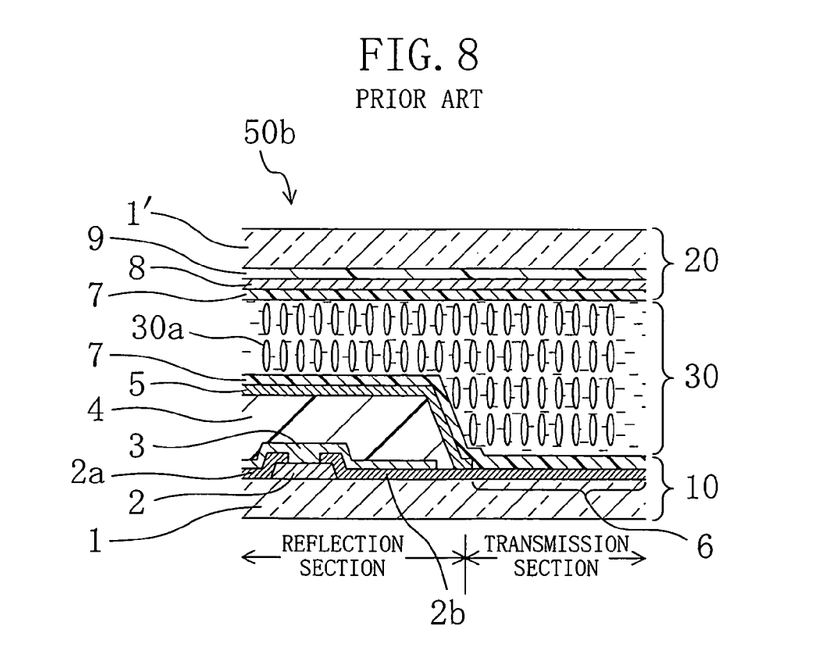
FIG. 8 is a schematic section of a conventional semi transmissive type liquid crystal display device of homeotropic orientation type.
Figure 9:
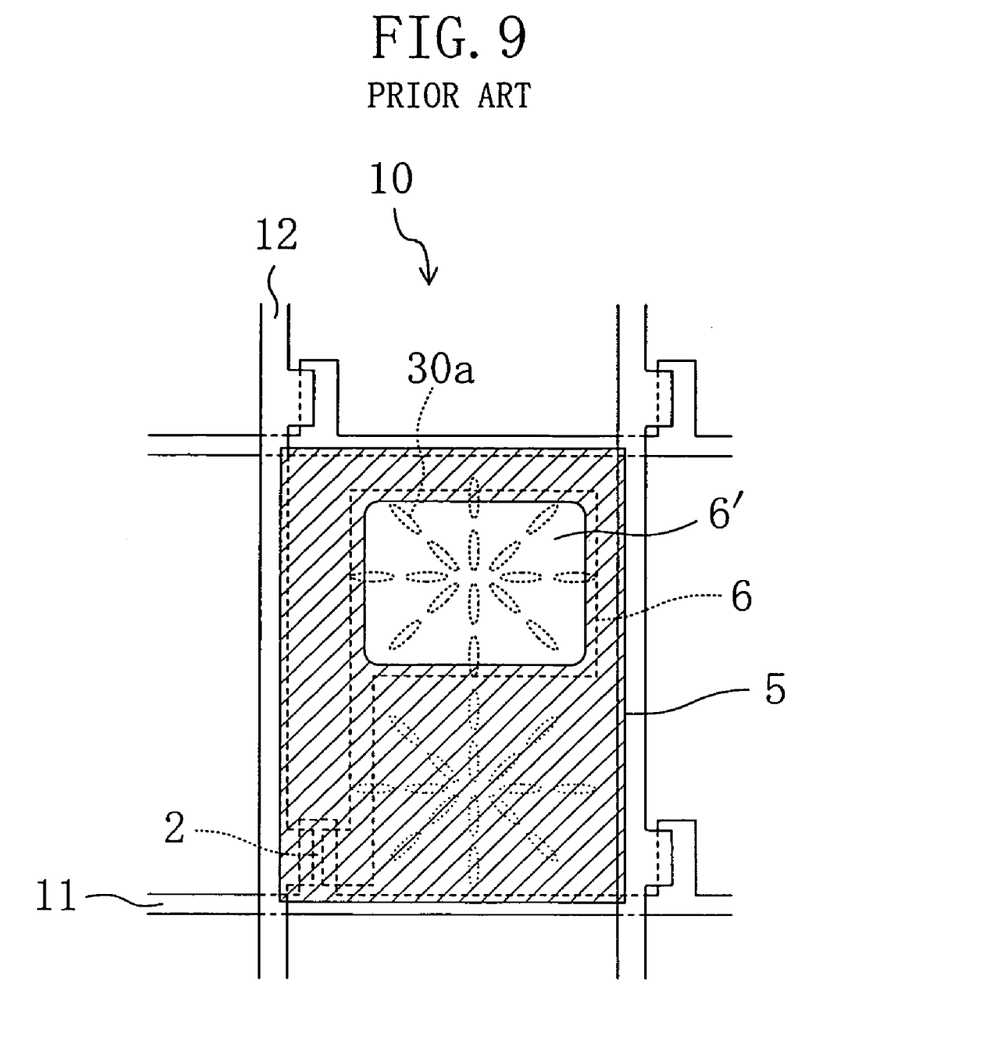
FIG. 9 is a schematic plan view of an active matrix substrate composing the conventional semi transmissive type liquid crystal display device of homeotropic orientation type.

FIG. 7 and FIG. 8 are schematic sections of semi transmissive type liquid crystal display devices 50a, 50b, respectively, disclosed for example, in Japanese Patent Application Laid Open Publication No. 2000-305110A, and FIG. 9 is a schematic plan view of an active matrix substrate 10 composing the semi transmissive type liquid crystal display device 50b.

Each of the semi transmissive type liquid crystal display devices 50a, 50b includes: the active matrix substrate 10 in which a plurality of pixel electrodes are arranged in matrix; a counter substrate 20 facing the active matrix substrate 10 in which a common electrode 8 is provided; and a liquid crystal layer 30 interposed between the substrates and composed of liquid crystal molecules 30a. Further, polarizing plates and retardation plates are attached to the outer surfaces of the substrates 10, 20.

In the active matrix substrate 10, a plurality of gate wires 11 and a plurality of source wires 12 are arranged so as to intersect at right angles with one another and a TFT 2 is provided at each intersection.

The TFT 2 is composed of: a gate electrode which forms a protruding portion of the corresponding gate wire 11; a gate insulating film provided so as to cover the gate electrode; a semiconductor layer formed on the gate insulating film; and a source electrode 2a and a drain electrode 2b both of which are formed on the semiconductor layer. The source electrode 2a is connected with the corresponding source wire 12, and the drain electrode 2b is made of a transparent conductive film, of which extended part serves as a transparent electrode 6.

Further, in the active matrix substrate 10, a protection insulating layer 3 is provided on a glass substrate 1 so as to cover the TFT 2. An interlayer insulating layer 4 is provided on the protection insulating layer 3. A reflecting electrode 5 connected with the transparent electrode 6 is provided on the interlayer insulating layer 4 to compose a pixel electrode in combination with the transparent electrode 6. In addition, an alignment layer 7 for orienting the liquid crystal molecules 30a is provided on the pixel electrode.

In the counter substrate 20, a color filter layer 9, a common electrode 8 and an alignment layer 7 for orienting the liquid crystal molecules 30a are provided sequentially in this order on a glass substrate 1'.

In each of the liquid crystal display devices 50a, 50b, a region where the reflecting electrode 5 serves as a reflection section and the other region (a transparent electrode exposed portion 6') serves as a transmission section. The reflection section reflects external light made incident from the counter substrate 20 side, and the transmission section transmits light of a backlight made incident from the active matrix substrate 10 side.

In each of the liquid crystal display devices 50a, 50b, for displaying an image, a gate signal is sent to a given gate wire 11 to allow each TFT 2 connected to the gate wire 11 to be ON state, and simultaneously, a source signal is sent from a given source wire 12 to write a predetermined charge to a corresponding pixel electrode composed of the reflecting electrode 5 and the transparent electrode 6 through the source electrode 2a and the drain electrode 2b. This causes potential difference between the pixel electrode and the common electrode 8, so that a predetermined voltage is applied to a liquid crystal capacitor composed of the liquid crystal layer 30. Then, by changing the orientation of the liquid crystal molecules 30a in the liquid crystal layer 30 by the applied voltage, the transmittance of the light made incident from outside through the polarizing plate is adjusted for displaying an image.

FIG. 7 and FIG. 8 also show orientation of the liquid crystal molecules 30a where no voltage is applied to the liquid crystal layer 30, wherein the semi transmissive type liquid crystal display device 50a shown in FIG. 7 is a liquid crystal display device of homogeneous orientation type in which the dielectric anisotropy of the liquid crystal molecules 30a is positive ($\Delta\epsilon>0$) and the liquid crystal molecules 30a are oriented in parallel with the planes of the substrates, and the semi transmissive type liquid crystal display device shown in FIG. 8 is a liquid crystal display device of homeotropic orientation type, as disclosed in Japanese Patent Application Laid Open Publication No. 2003-167253A, in which the dielectric anisotropy of the liquid crystal molecules 30a is negative ($\Delta\epsilon<0$) and the liquid crystal molecules 30a are oriented perpendicular to the planes of the substrates.

Referring to the semi transmissive type liquid crystal display device 50b, in which the dielectric anisotropy is negative ($\Delta\epsilon<0$), the liquid crystal molecules 30a are oriented in parallel with the substrate planes when sufficient voltage for orienting the liquid crystal molecules 30a in response to the electric field is applied, so that the liquid crystal molecules 30a are oriented radially with one orientation center as a base point when viewing from the upper side of the substrate plane, as shown in FIG. 9.

In order to prevent sticking of an image, an AC driving method, in which the polarity of voltage applied to the liquid crystal layer is exchanged alternately between positive and negative is employed in liquid crystal display devices. For example, there is a method for alternately exchanging the polarity of voltage applied to the liquid crystal layer between positive and negative by writing charge of which polarity is inverted between positive and negative in every predetermined cycle into the reflecting electrode and the transparent electrode (the pixel electrode). In this method, an optimum counter potential is set in the potential of the common electrode of the counter substrate so as to effectively equalize the voltage applied to the liquid crystal layer between positive and negative.

The optimum counter potential depends on the structure of the pixel, the gate voltage applied to the TFT, the material of the electrodes and the like.

In the semi transmissive type liquid crystal display devices 50a, 50b respectively shown in FIG. 7 and FIG. 8, the reflecting electrode 5 in the reflection section is made of an aluminum thin film, the transparent electrode 6 in the transmission section is made of ITO (Indium Tin Oxide), for example, and therefore, the work functions of the materials of the electrodes 5, 6 are different from each other. Accordingly, the optimum counter potential of the common electrode 8 is different between in the reflection section and in the transmission section.

The work function herein is minimum energy required for taking a single electron immediately outside the surface portion of a metal or the like from the surface portion, and the magnitude thereof depends greatly on a kind of atom in the surface portion, orientation of a plane, other atoms and the like. For this reason, if the materials of the electrodes are different for the reflection section and for the transmission section, the surface potential is different between the reflecting electrode 5 and the transparent electrode 6, resulting in difference in applied voltage therebetween. The difference in applied voltage leads to difference in optimum counter potential of the common electrode 8 between in the reflection section and in the transmission section.

In order to reduce the difference between retardation in the reflection section and retardation in the transmission section, the liquid crystal layer 30 is formed so that the thickness in the reflection section is ½ of that in the transmission section, and therefore, the reflecting electrode 5 is located near the common electrode 8. Accordingly, the electric field of the reflection section is stronger than that of the transmission section. For this reason, the reflecting electrode 5 is liable to absorb an ionic impurity included in the liquid crystal layer 30, thereby storing surplus charge. This generates a difference in stored charge amount between the reflection section and the transmission section, and generates a difference in applied voltage therebetween. Due to the difference in applied voltage, the optimum counter potential of the common electrode 8 becomes different between the reflection section and the transmission section.

With the difference in optimum counter potential between in the reflection section and in the transmission section generated for the above reasons, display quality may be lost in the display device of homeotropic orientation type shown in FIG. 8 though no problem is involved and uniform display is capable in the device of the homogeneous orientation type shown in FIG. 7.

In detail, in the semi transmissive type liquid crystal display device 50b of homeotropic orientation type, the alignment film 7 less affects (orientation restricting force) the liquid crystal molecules 30a, and therefore, slight imbalance of the electric fields which are caused due to the difference in applied voltage may cause orientation turbulence of the liquid crystal molecules 30a.

Further in detail, when the potential of the common electrode 8 is set to be an optimum counter potential of the transmission section, the magnitude of the voltage applied to the liquid crystal layer is slightly different between positive and negative in the reflection section. Accordingly, DC voltage caused from the voltage difference between positive and the negative is applied to the liquid crystal layer 30 in the reflection section. Electric field strain generated by the DC voltage causes non-uniform behavior of the liquid crystal molecules 30a at a step portion between the reflection section and the transmission section, which invites orientation turbulence of the liquid crystal molecules 30a in the vicinity of the step portion.

The orientation turbulence is different in pixels and changes the transmittance of each pixel, with a result that roughness (local variation in contrast ratio) in a displayed image in the transmission mode may be observed.

Referring to a semi transmissive type liquid crystal display device disclosed in Japanese Patent Application Laid Open Publication No. 2003-315766A, the reflecting electrode is covered with an amorphous transparent conductive film so that the potentials of the reflecting electrode and the transparent electrode are substantially equalized to each other, thereby reducing flicker.

Further, in Japanese Patent Application Laid Open Publication No. 2003-57639A discloses that in a semi transmissive type liquid crystal display device, the potential difference of voltage applied to the reflection section is set smaller than that applied to the transmission section by dividing the capacitor so as to minimize the anisotropy of the refractive index in the reflection section, with a result that orientation defects of the liquid crystal molecules at the boundary between the reflection section and the transmission section is prevented.

In addition, Japanese Patent Application Laid Open Publication No. 10-206845A discloses that in a reflective type liquid crystal display device, the common electrode and the reflecting electrode (pixel electrode) which interpose a liquid crystal layer have work functions substantially equal to each other, taking account of the work function of the materials of the electrodes, thereby reducing flicker.

BRIEF SUMMARY

The present invention has been made in view of the aforementioned problems and has an object prevention of roughness in a displayed image in a semi transmissive type liquid crystal display device of homeotropic orientation type in which liquid crystal molecules are oriented perpendicular to a plane of a substrate when no voltage is applied to a liquid crystal layer.

To attain the above object, a liquid crystal display device includes applied voltage adjusting means that approximates voltage applied to the liquid crystal layer in a reflection section to voltage applied to the liquid crystal layer in a transmission section.

Specifically, a liquid crystal display device includes: a first substrate and a second substrate which face each other; a liquid crystal layer which is interposed between the first substrate and second substrate and which is composed of liquid crystal molecules; and a plurality of pixels each comprised of a reflection section that performs display in a reflection mode and a transmission section that performs display in a transmission mode, wherein a reflecting electrode for applying voltage to the liquid crystal layer in the reflection section and a transparent electrode for applying voltage to the liquid crystal layer in the transmission section are provided in the first substrate, the transparent electrode being connected with the reflecting electrode electrically, a common electrode is provided so as to face the first substrate in the second substrate, the liquid crystal molecules are oriented substantially perpendicular to planes of the substrates when no voltage is applied to the liquid crystal layer in the liquid crystal layer in each of the pixels, and applied voltage adjusting means is provided which approximates voltage applied to the liquid crystal layer in the reflection section to voltage applied to the liquid crystal layer in the transmission section.

In the above construction, the applied voltage adjusting means that approximates voltage applied to the liquid crystal layer in the reflection section to voltage applied to the liquid crystal layer in the transmission section is provided, and thus, difference in applied voltage is minimized between in the reflection section and in the transmission section. Therefore, orientation of the liquid crystal molecules is uniformed even, for example, in the vicinity of a step portion located in a boundary region between the reflection section that performs display in a reflection mode and the transmission section that performs display in a transmission mode. Thus, the transmittances of the respective pixels are equalized, thereby restraining roughness in a displayed image.

The applied voltage adjudicating means may be made of a transparent conductive film so as to cover at least the reflecting electrode.

In the above arrangement, the reflecting electrode is covered with the transparent conductive film and the transparent electrode is made of a transparent conductive film in general, so that the surface portions of the electrodes for applying voltage to the liquid crystal layer are formed of the transparent conductive film in both the reflection section and the transmission section. Therefore, the surface potentials of the electrodes in the reflection section and in the transmission section become equal to each other, difference in work function between the reflecting electrode and the transparent electrode are equalized, and thus, the optimum counter potential of the common electrode is substantially equalized between in the reflection section and in the transmission section. Accordingly, the difference in applied voltage between in the reflection section and in the transmission section is minimized, and the orientation of the liquid crystal molecules, for example, in the vicinity of the step portion in the boundary region between the reflection section and the transmission section is uniformed. In turn, the transmittances of the respective pixel are equalized, thereby restraining roughness in a displayed image.

Japanese Patent Application Laid Open Publication No. 10-206845A discloses that taking account of work functions of materials of the electrodes, the work functions of a common electrode and a reflecting electrode (pixel electrode) which interpose a liquid crystal layer are equalized in a reflective type liquid crystal display device. While, the present invention is directed to a semi transmissive type liquid crystal display device of homeotropic orientation type in which each pixel electrode is divided into the reflecting electrode and the transparent electrode, the liquid crystal molecules are oriented perpendicular to the substrate when no voltage is applied, and the liquid crystal molecules are oriented in parallel with the substrate when sufficient voltage for orienting the liquid crystal molecules in response to the electric field is applied (hereinafter referred to as "voltage applied state"). Therefore, the present invention solves different problems by different means from those in Japanese Patent Application Laid Open Publication No. 10-206845A.

Further, Japanese Patent Application Laid Open Publication No. 2003-315766A discloses that in a semi transmissive type liquid crystal display device, taking account of working functions of materials of the electrodes, a reflecting electrode is covered with an amorphous transparent conductive film made of an IZO (Indium Zinc Oxide) film to equalize the potentials of the reflecting electrode and a transparent electrode. However, the object of Japanese Patent Application Laid Open Publication No. 2003-315766A is to restrain flicker and is not to solve the problem of roughness in a displayed image as in the present invention.

Furthermore, Japanese Patent Application Laid Open Publication No. 2003-315766A fails to suggest the problem of roughness in a displayed image caused by orientation turbulence in the vicinity of the step portion between the reflection section and the transmission section in the voltage applied state in liquid crystal molecules of which dielectric anisotropy is negative ($\Delta\epsilon<0$). Because, it is considered that Japanese Patent Application Laid Open Publication No. 2003-315766A is directed to a semi transmissive type liquid crystal display device using liquid crystal molecules of which dielectric anisotropy is positive ($\Delta\epsilon>0$) and takes no account of a semi transmissive type liquid crystal display device using liquid crystal molecules of which dielectric anisotropy is negative ($\Delta\epsilon<0$).

The present inventors have found a fact that behavior of liquid crystal molecules of which dielectric anisotropy is positive ($\Delta\epsilon>0$) and behavior of liquid crystal molecules of which dielectric anisotropy is negative ($\Delta\epsilon<0$) are remarkably different in the vicinity of the step portion between the reflection section and the transmission section in the voltage applied state.

The fact will be described below in detail with reference to drawings.

Figure 10A:
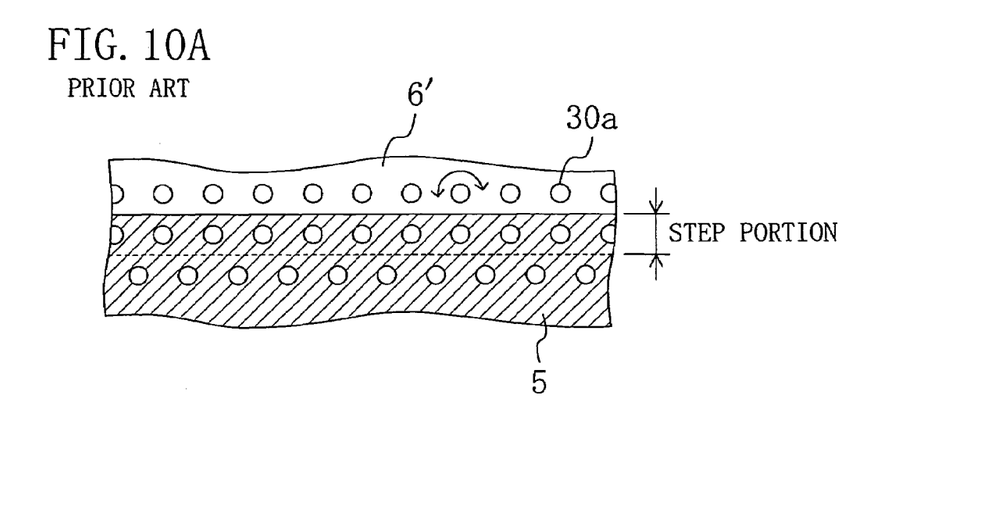
FIG. 10A and FIG. 10B are schematic plan views in an enlarged scale showing step portions between reflection sections and transmission sections in the conventional semi transmissive type liquid crystal display devices in FIG. 7 and FIG. 8, respectively.
Figure 10B:
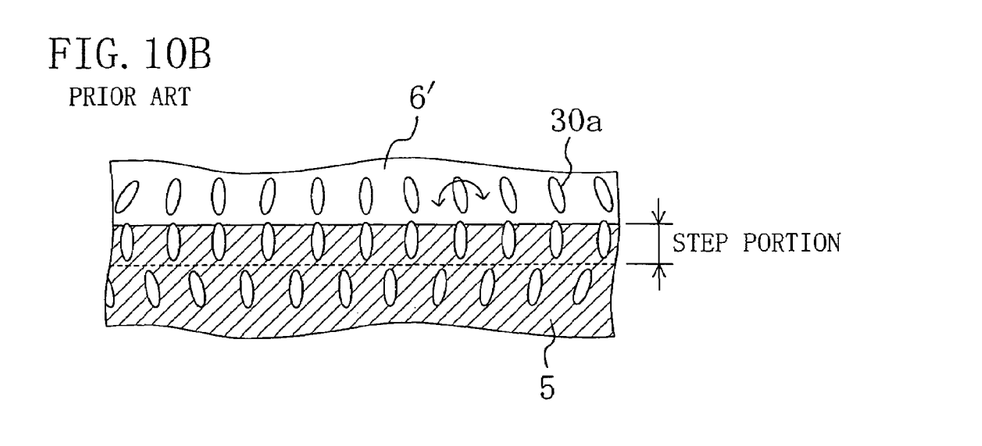

FIG. 10A is a schematic plan view showing, in an enlarged scale, the vicinity of a step portion between a reflection section (a reflecting electrode 5) and a transmission section (a transparent electrode exposed portion 6') in a semi transmissive type liquid crystal display device using liquid crystal molecules of which dielectric anisotropy is positive ($\Delta\epsilon>0$), and FIG. 10B is a schematic plan view showing, in an enlarged scale, a step portion between a reflection section (a reflecting electrode 5) and a transmission section (a transparent electrode exposed portion 6') in a semi transmissive type liquid crystal display device using liquid crystal molecules of which dielectric anisotropy is negative ($\Delta\epsilon<0$).

In the case where the liquid crystal molecules of which dielectric anisotropy is positive ($\Delta\epsilon>0$) are used, the liquid crystal molecules 30a in the vicinity of the step portion are oriented substantially perpendicular to the substrate when voltage is applied, as shown in FIG. 10A. Accordingly, when minute potential difference is generated between in the reflection section and in the transmission section, the liquid crystal molecules 30a rotate or move in parallel with respect to a plane parallel to the substrate. However, variation in directors (unit vector in orientation direction) of the liquid crystal molecules is small in the vicinity of the step portion and orientation turbulence is barely occurs. Thus, no roughness appears in a displayed image.

On the other hand, in the case where the liquid crystal molecules of which dielectric anisotropy is negative ($\Delta\epsilon<0$) is used, the liquid crystal molecules 30a in the vicinity of the step portion are oriented so as to be tilted in parallel with respect to the substrate in the voltage applied state, as shown in FIG. 10B. Accordingly, if the liquid crystal molecules 30a rotate or move in parallel with respect to a plane parallel to the substrate when minute potential difference between the reflection section and the transmission section is generated, the directors of the liquid crystal molecules are scattered and the orientation is disturbed in the vicinity of the step portion, with a result that roughness is observed in a displayed image.

Further, conventional semi transmissive type liquid crystal display devices in which liquid crystal molecules have a dielectric anisotropy positive ($\Delta\epsilon>0$) generally employ a normally white mode for black display in the voltage applied state. In the normally white mode, even if the orientation of the liquid crystal molecules is disturbed, roughness is barely visible because of black display in the voltage applied state.

On the other hand, semi transmissive type liquid crystal display devices in which liquid crystal molecules have a dielectric anisotropy negative ($\Delta\epsilon<0$) generally employ a normally black mode for white display in the voltage applied state. Therefore, roughness is easily visible when the orientation of the liquid crystal molecules is disturbed in the voltage applied state.

In this way, the object of restraining roughness in a displayed image is not easily inferred in such conventional semi transmissive type liquid crystal display devices in which liquid crystal molecules have a dielectric anisotropy positive ($\Delta\epsilon>0$), but is a peculiar object in semi transmissive type liquid crystal display devices in which liquid crystal molecules have a dielectric anisotropy negative ($\Delta\epsilon<0$).

The aforementioned applied voltage adjusting means may be provided so as to cover the transparent electrode.

With the above arrangement, the reflecting electrode and the transparent electrode are covered with the transparent conductive film. Accordingly, the surfaces of the electrodes for applying voltage to the liquid crystal layer are made of the same transparent conductive film in the reflection section and in the transmission section, whereby the surface potentials are substantially equalized therebetween, the difference in work function between the reflecting electrode and the transparent electrode is canceled, and the optimum counter potential of the common electrode is substantially equalized to each other. As a result, difference in applied voltage is minimized between in the reflection section and in the transmission section, and the liquid crystal molecules, for example, in the vicinity of the step portion in the boundary region between the reflection section and the transmission section are uniformly oriented. Hence, the transmittances of the respective pixels are equalized and roughness in a displayed image is retrained.

The difference in voltage applied to the liquid crystal layer between in the reflection section and in the transmission section may be set to be 300 mV or lower.

By this setting, the difference in voltage applied to the liquid crystal layer between in the reflection section and in the transmission section becomes small, 300 mV or lower, and accordingly, roughness in a displayed image is reduced to an invisible degree.

The reflection section and the transmission section may be AC driven.

In so doing, the reflection section and the transmission section are AC driven by inverting the potentials of the reflecting electrode and the transparent electrode, so that the potential of the common electrode is set to be an optimum counter potential that effectively equalizes the voltage applied to the liquid crystal layer between positive and negative. Wherein, in conventional semi transmissive type liquid crystal display devices, the materials and structure of the electrodes are different between the reflection section and the transmission section, and therefore, the optimum counter potentials are different therebetween. This difference may cause difference in voltage applied to the liquid crystal layer between in the reflection section and in the transmission section.

However, in the liquid crystal display device of the present technology, the applied voltage adjusting means that approximates the voltage applied to the liquid crystal layer in the reflection section to the voltage applied to the liquid crystal layer in the transmission section is provided, so that the difference in applied voltage between in the reflection section and in the transmission section is minimized. Hence, the liquid crystal molecules are oriented uniformly, for example, in the vicinity of the step portion in the boundary region between the reflection section and the transmission section and the transmittances of the respective pixels are equalized, thereby retraining roughness in a displayed image.

The reflecting electrode may be electrically connected with the transparent electrode through the step portion in the boundary region between the reflection section and the transmission section.

With this arrangement, the reflecting electrode is electrically connected with the transparent electrode not through a contact hole but through the step portion in the boundary region between the reflection section and the transmission section. Therefore, the orientation of the liquid crystal molecules may be disturbed in the vicinity of the step portion and roughness may be caused in a displayed image.

However, in the liquid crystal display device of the present technology, which includes the applied voltage adjusting means, the difference in applied voltage between in the reflection section and in the transmission section is minimized. Thus, the liquid crystal molecules are oriented uniformly in the vicinity of the step portion in the boundary region between the reflection section and the transmission section and the transmittances of the respective pixels are equalized, thereby restraining roughness in a displayed image.

The liquid crystal layer in the reflection section except the step portion may be set to have thickness different from that of the liquid crystal layer in the transmission section.

By this setting, the thickness of the liquid crystal layer in the reflection section except the step portion is different from that of the liquid crystal layer in the transmission section, so that the strength of the electric filed of the liquid crystal layer in the reflection section except the step portion is different from that in the transmission section. In this association, the electrode (the reflecting electrode or the transparent electrode) of which electric filed is stronger are liable to absorb ionic impurity included in the liquid crystal layer and surplus charge is liable to be stored. Accordingly, difference in stored charge amount is caused between the reflection section and the transmission section and the applied voltage may be different therebetween.

However, in the semi transmissive type liquid crystal display device of the present technology, which includes the applied voltage adjusting means that approximates the voltage applied to the liquid crystal layer in the reflection section to the voltage applied to the liquid crystal layer in the transmission section, the difference in applied voltage between in the reflection section and in the transmission section, which may be caused due to the difference in stored charge amount between the reflection section and the transmission section, becomes not too large to cause roughness in a displayed image. Therefore, the liquid crystal molecules are oriented uniformly in the vicinity of the step portion in the boundary region between the reflection section and the transmission section and the transmittances of the respective pixels are equalized, thereby restraining roughens in a displayed image.

The liquid crystal layer in the reflection section except the step portion may be set to have a thickness of substantially ½ of that of the liquid crystal layer in the transmission section.

By this setting, the thickness of the liquid crystal layer in the reflection section except the step portion is substantially ½ of that of the liquid crystal layer in the transmission section, so that the difference between retardation in the reflection section and retardation in the transmission section is reduced but the electric filed of the reflection section is stronger than the electric field of the transmission section because the reflecting electrode is located nearer the common electrode. In this association, the reflecting electrode is liable to absorb ionic impurity included in the liquid crystal layer and surplus charge is liable to be stored. As a result, the difference in stored charge amount is caused between the reflection section, and the transmission section, and difference in applied voltage may be caused therebetween.

However, in the semi transmissive type liquid crystal display device of the present technology, which includes the applied voltage adjusting means that approximates the voltage applied to the liquid crystal layer in the reflection section to the voltage applied to the liquid crystal layer in the transmission section, the difference in applied voltage between the reflection section and the transmission section, which may be caused due to the difference in stored charge amount between the reflection section and the transmission section, becomes not too large to cause roughness in a displayed image. Therefore, the liquid crystal molecules are oriented uniformly in the vicinity of the step portion in the boundary region between the reflection section and the transmission section and the transmittances of the respective pixels are equalized, thereby restraining roughens in a displayed image.

It is possible to perform white display by orienting the liquid crystal molecules substantially in parallel with the plane of the substrate when voltage is applied to the liquid crystal layer.

In so doing, the liquid crystal display device is in the normally black mode that performs white display when voltage is applied to the liquid crystal layer. Therefore, when orientation turbulence of the liquid crystal molecules is caused in the voltage applied state, the turbulence may be viewed as roughness in a displayed image.

However, in the semi transmissive type liquid crystal display device of the present technology, which includes the applied voltage adjusting means, the difference in applied voltage between in the reflection section and in the transmission section is minimized. Hence, the liquid crystal molecules are oriented uniformly in the vicinity of the step portion in the boundary region between the reflection section and the transmission section and the transmittances of the respective pixels are equalized, thereby restraining roughness in a displayed image.

It is possible to perform white display by orienting the liquid crystal molecules radially when voltage is applied to the liquid crystal layer.

In so doing, the liquid crystal molecules are oriented radially when voltage is applied to the liquid crystal layer, and hence, the semi transmissive type liquid crystal display device has a wide viewing angle.

DETAILED DESCRIPTION

The example embodiments are described below with reference to accompanying drawings. In the following embodiments, a semi transmissive type liquid crystal display device of the active matrix driving type using TFTs as switching elements, and which is capable of performing display in a transmission mode and display in a reflection mode, is described as one example. However, the present invention is not limited to the following embodiments and may have other constitutions.

Embodiment 1

Figure 1:
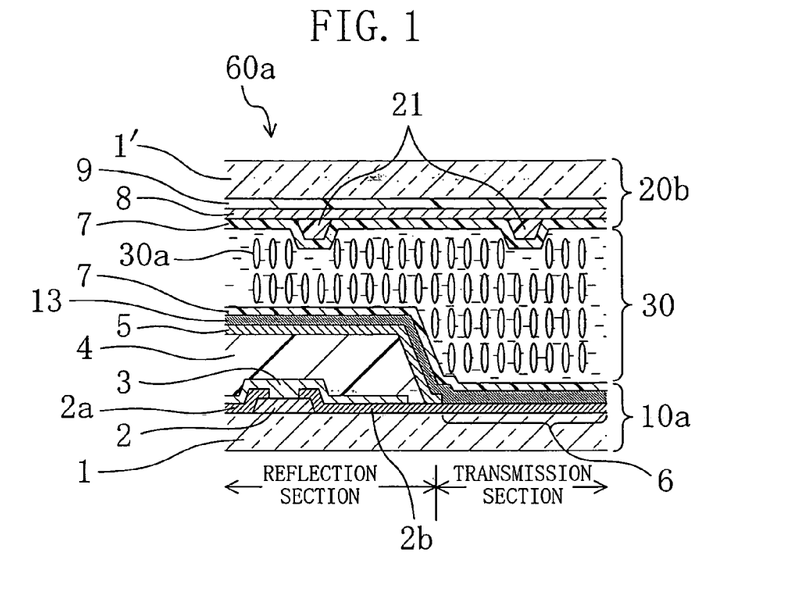
FIG. 1 is a schematic section of a semi transmissive type liquid crystal display device according to example Embodiment 1.
Figure 2:
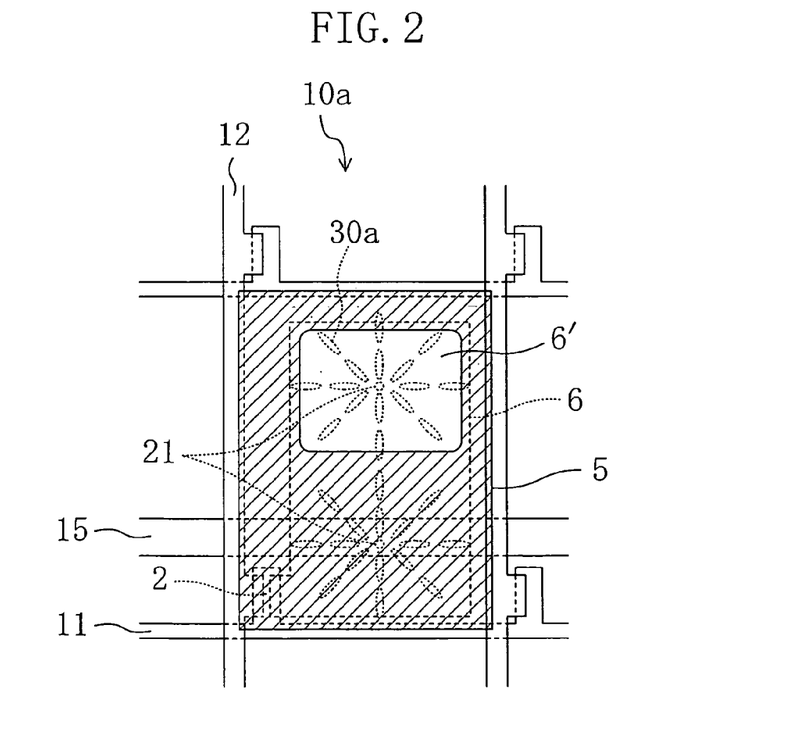
FIG. 2 is a schematic plan view of an active matrix substrate composing the semi transmissive type liquid crystal display device.

FIG. 1 is a schematic section of the semi transmissive type liquid crystal display device 60a according to a first example embodiment, and FIG. 2 is a schematic plan view of an active matrix substrate 10a composing the semi transmissive type liquid crystal display device 60a.

The semi transmissive type liquid crystal display device 60a includes: the active matrix substrate 10a serving as a first substrate; a counter substrate 20b serving as a second substrate provided so as to face the active matrix substrate 10a; and a liquid crystal layer 30 provide so as to be interposed between the substrates 10a and 20b.

The active matrix substrate 10a includes: a plurality of gate wires 11 extending in parallel with one another; a plurality of source wires 12 extending in parallel with one another so as to intersect with the gate wires 11 at right angles; a plurality of capacitor wires 15 extending between the respective gate wires 11 in parallel with the gate wires 11; a TFT 2 provided at each intersection of the gate wires 11 and the source wires 12; and a pixel electrode which is provided for the TFT 2 in a display region surrounded by the respectively adjacent gate wires 11 and the respectively adjacent source wires 12. The pixel electrode comprised of a reflecting electrode 5 and a transparent electrode 6.

The active matrix substrate 10a is in a multilayered structure in which a gate insulting film, a protection insulating film 3 and an interlayer insulating film 4 are formed in this order on an insulating substrate 1.

The gate wires 11 and the capacitor wires 15 are provided between the insulating substrate 1 and the gate insulating film. For each gate wire 11, a gate electrode protrudes in a direction along the source wires 12 for the TFT 2.

A semiconductor layer forming the TFT 2 is provided between the gate insulating film and the protection insulting film 3. The source wires 12 are formed on the semiconductor layer. A source electrode 2a protruding from each source wire 11 in a direction along the gate wires 11 and a drain electrode 2b facing the source electrode 2a are provide for the TFT 2 further on the semiconductor layer.

The reflecting electrode 5 is connected with the drain electrode 2b (the transparent electrode 6) and forms a reflection section for performing display in a reflection mode is provided on the interlayer insulating film 4.

The drain electrode 2b extends in a region where the protection insulating film 3 and the interlayer insulating film 4 are not formed and the extended part serves as the transparent electrode 6. The transparent electrode 6 (a transparent electrode exposed portion 6') exposed from the reflecting electrode 5 forms a transmission section for performing display in a transmission mode.

The thickness of the interlayer insulating film 4 is set so that the thickness of the liquid crystal layer 30 in the reflection section is substantially ½ of that in the transmission section.

The reflection section (reflecting electrode 5) is located around the transmission section (the transparent electrode exposed portion 6') as shown in FIG. 2. A step portion, which is mainly comprised of the interlayer insulating film 4, is formed in a boundary region between the reflection section and the transmission section. The reflecting electrode 5 and the transmission electrode exposed portion 6' (the transparent electrode 6) are electrically connected with each other through the step portion.

A part facing the capacitor wire 15 of the extended part of the drain electrode 2b serves as an auxiliary capacitor electrode composing an auxiliary capacitor in combination with the capacitor wire 15 through the gate insulating film.

On the reflecting electrode 5 and the transparent electrode 6, a transparent electrode covering film 13 is provided, and an alignment film 7 is provided on the electrode covering film 13.

The electrode covering film 13 is a transparent conductive film functioning as applied voltage adjusting means for compensating for a difference in the work functions between the reflecting electrode 5 and the transparent electrode 6.

In the active matrix substrate 10a, the TFT 2 is comprised of the gate electrode, the gate insulating film, the semiconductor layer, the source electrode 2a and the drain electrode 2b. The reflecting electrode 5, which is located on the TFT 2, reflects external light and thereby uses the reflected light for display, and also shields external light incident into the TFT 2 as a light shielding film. Accordingly, leakage current caused due to light of the TFT 2 is prevented.

The counter substrate 20b is in a multilayered structure in which a color filter layer 9, a black matrix, an overcoat layer, a common electrode 8 and an alignment film 7 are formed in this order on an insulating substrate 1'. Protruding portions serving as rivets 21 are formed between the common electrode 8 and the alignment film 7 so as to correspond respectively to the reflecting electrode 5 and the transparent electrode 6 on the active matrix substrate 10a.

The rivet 21 is provided for forming an orientation center in the transmission section and in the reflection section in a voltage applied state.

When no voltage is applied to the liquid crystal layer 30, the liquid crystal molecules 30a in the vicinity of the rivets 21 are oriented and tilted radially with the rivets 21 as centers. Other liquid crystal molecules 30a, located apart from the rivets 21, are oriented substantially perpendicularly to the plane of the substrate. On the other hand, when voltage is applied to the liquid crystal layer 30, the liquid crystal molecules 30a located apart from the rivets 21 are also oriented and tilted in the aforementioned radial direction so as to match the liquid crystal molecules 30a in the vicinity of the rivets 21. Such orientation of the liquid crystal molecules widens the viewing angle in image display.

In the example embodiment, the liquid crystal layer 30 is comprised of liquid crystal molecules 30a of nematic liquid crystal having an electrooptic characteristic which has a dielectric anisotropy negative ($\Delta\epsilon<0$).

In the semi transmissive type liquid crystal display device 60a, one pixel is formed in each pixel electrode (the reflecting electrode 5 and the transparent electrode 6). In each pixel, when the TFT 2 is in ON state when a gate signal is sent from the corresponding gate wire 11, a source signal is sent from the corresponding source wire 12 so that a predetermined charge is written into the reflecting electrode 5 and the transparent electrode 6 via the source electrode 2a and the drain electrode 2b. This causes potential difference between the common electrode 8 and the electrodes (the reflecting electrode 5 and the transparent electrode 6), so that a predetermined voltage is applied to the liquid crystal capacitor and the auxiliary capacitor which are formed of the liquid crystal layer 30.

In the semi transmissive type liquid crystal display device 60a, the liquid crystal molecules 30a of the liquid crystal layer 30 oriented substantially perpendicular to the substrate plane are oriented in parallel with the substrate plane radially with the rivets 21 as centers when voltage is applied to the liquid crystal layer 30. The orientation state of the liquid crystal molecules 30a is changed according to the magnitude of the applied voltage. For displaying an image, the transmittance is adjusted by utilizing the change in the orientation state.

In order to prevent sticking of an image, AC current driving is employed which exchanges alternately the polarity of the voltage applied to the liquid crystal layer 30 between positive and negative by utilizing potential inversion of the reflecting electrode 5 and the transparent electrode 6. In this association, an optimum counter potential is set in the common electrode 8 for equalizing the voltage applied to the liquid crystal layer 30 effectively between positive and negative.

In the semi transmissive type liquid crystal display device 60a with the above construction, the reflecting electrode 5 and the transparent electrode 6 are comprised of different materials and have different work functions. However, the electrode covering film 13 is provided so as to cover the reflecting electrode 5 and the transparent electrode 6 for compensating for the difference in work functions. Hence, the optimum counter potential of the common electrode 8 is substantially equalized between the reflection section and the transmission section, and the difference in applied voltage therebetween is reduced to 300 mV or lower. As a result, the liquid crystal molecules 30a are oriented uniformly in the vicinity of the step portion in the boundary region between the reflections section and the transmission section and the transmittances of the respective pixels are equalized, thereby restraining roughness in a displayed image.

The thickness of interlayer insulating film 4 is so set that the liquid crystal layer 30 in the reflection section has a thickness of substantially ½ of the thickness of the liquid crystal layer 30 in the transmission section. Therefore, the difference between retardation in the reflection section and retardation in the transmission section is reduced. In this connection, the reflecting electrode 5 is located nearer the common electrode 8 than the transparent electrode 6, so that the electric field of the reflection section is stronger than that of the transmission section. Therefore, the reflecting electrode 5 absorbs an ionic impurity included in the liquid crystal layer 30 easily, thereby storing surplus charge. This surplus charge may cause a difference in a stored charge amount between the reflection section and the transmission section, and applied voltage may be different therebetween. However, since the electrode covering film 13 is provided on the reflecting electrode 5 and the transparent electrode 6 as described above, the difference in applied voltage between the reflection section and the transmission section does not become too great to cause roughness in a displayed image even if the difference in applied voltage between the reflection section and the transmission section is caused by the difference in stored charge amount therebetween.

Further, the orientation turbulence of the liquid crystal molecule 30a in the vicinity of the step portion in the boundary region between the reflection section and the transmission section is restrained. This obviates time otherwise required for stabilizing the orientation. Hence, the response speed for displaying an image is increased, which facilitates a moving image display.

Semi transmissive type liquid crystal display devices of homeotropic orientation type can employ a display mode of normally black which performs black display when no voltage is applied to the liquid crystal layer. Hence, semi transmissive type liquid crystal display devices of homeotropic orientation can provide a display with high contrast, compared with the conventional semi transmissive type liquid crystal display device 50a as shown in FIG. 7 which employs a display mode of normally white. Therefore, the semi transmissive type liquid crystal display device 60a can provide a moving image display and can provide display at a wider viewing angle with high contrast, which are features of the homeotropic orientation type.

A fabricating method for the semi transmissive type liquid crystal display device 60a according to Embodiment 1 will be described next in detail.

<Active Matrix Substrate Fabricating Process>

First, a metal film made of titanium or the like is formed on the entirety of the insulating substrate 1 such as a glass substrate by a sputtering method, and then, is patterned by a photolithography technique (Photo Engraving Process: hereinafter referred to as PEP technique) to form the gate wires 11, the gate electrode and the capacitor wires 15.

Next, a silicon nitride film or the like is formed on the entirety of the substrate over the gate wires 11, the gate electrode and the capacitor wires 15 by a CVD (Chemical Vapor Deposition) method to form the gate insulating film.

Subsequently, an intrinsic amorphous silicon film and a n+ amorphous silicon film in which phosphorus is doped are sequentially formed on the entirety of the substrate over the gate insulating film, and then, is patterned into an island shape on the gate electrodes by the PEP technique to form the semiconductor layer formed of the intrinsic amorphous layer and the n+ amorphous silicon layer.

Next, a transparent conductive film made of an ITO film is formed by a sputtering method on the entirety of the substrate over the gate insulating film where the semiconductor layer is formed, and then, is patterned by the PEP technique to form the drain electrode 2b and the transparent electrode 6.

Subsequently, a metal film made of titanium or the like is formed by a sputtering method on the entirety of the substrate over the gate insulating film where the drain electrode 2b and the transparent electrode 6 are formed, and then, is patterned by the PEP technique to form the source wires 12 and the source electrode 2a.

Next, the n+ amorphous silicon layer of the semiconductor layer is etched and removed using the source electrode 2a and the drain electrode 2b as a mask to form a channel portion.

Subsequently, a silicon nitride film or the like is formed on the entirety of the substrate over the source electrode 2a and the drain electrode 2b by a CVD method, and then, is patterned by the PEP technique to form the protection insulting film 3 that covers the TFT 2 composed of the gate electrode, the gate insulating film, the semiconductor layer, the source electrode 2a and the drain electrode 2b.

Next, a photosensitive acryl resin or the like is applied on the entirety of the substrate over the protection insulting film 3, and then, is patterned by the PEP technology to form the interlayer insulating film 4 that covers the protection insulating film 3.

The surface of the interlayer insulating film 4 may be rough by the PEP technique. In this association, the surface of the reflecting electrode 5 on the interlayer insulating film 4 becomes rough, with a result that light incident into the reflecting electrode 5 can be appropriately scattered.

Subsequently, a molybdenum film and an aluminum film are formed sequentially on the entirety of the substrate over the interlayer insulting film 4 by a sputtering method, and then, is patterned by the PEP technique to form the reflecting electrode 5 so as to be laid over the TFT 2.

The molybdenum film is interposed between the aluminum film forming the reflecting electrode 5 and the ITO film forming the transparent electrode 6, and therefore, a local battery is not formed between the aluminum film and the ITO film in developing the aluminum film by the PEP technique, resulting in prevention of electric corrosion.

Next, a transparent conductive film (about 10 nm in thickness) made of an IZO (Indium Zinc Oxide) film is formed on the entirety of the substrate over the reflecting electrode 5 and the transparent electrode 6 by a sputtering method, and then, is patterned by the PEP technique to form the electrode covering film 13 so as to cover the reflecting electrode 5 and the transparent electrode 6.

A transparent conductive film such as an AZO (Aluminum Zinc Oxide) film, a GZO (Gallium Zinc Oxide) film and the like may be used as the electrode covering film 13, instead of the IZO film.

Subsequently, a polyimide resin (e.g., OPTMER AL produced by JSR Corporation) is applied on the entirety of the substrate over the electrode covering film 13 by offset lithography, to form the alignment film 7.

Thus, the active matrix substrate 10a is completed.

The method using the semiconductor layer made of an amorphous silicon film is referred to in the above fabricating method for the active matrix substrate 10a, but the semiconductor layer may be made of a polysilicon film or formed by subjecting an amorphous silicon film and a polysilicon film to laser annealing for improving the crystallinity.

<Counter Substrate Fabricating Process>

First, a chromium thin film is formed on the insulating substrate 1', and then, is patterned by the PEP technique to form black matrix.

Subsequently, colored layers of red, green and blue are formed and patterned among the black matrix to form a color filter layer 9.

Next, an acryl resin is applied to the entirety of the substrate over the color filter layer 9 to form the overcoat layer.

Subsequently, an ITO film is formed on the entirety of the substrate over the overcoat layer to form the common electrode 8.

Next, a photosensitive acryl resin or the like is applied on the entirety of the substrate over the common electrode 8, and then, is patterned by the PEP technique to form the rivets 21 so as to correspond respectively to the reflecting electrode 5 and the transparent electrode 6 on the active matrix substrate 10.

A hole may be formed in the ITO film at a part corresponding to each rivet 21, instead of the formation of the rivets 21 on the common electrode 8, or a hole may be formed in the reflecting electrode 5, the transparent electrode 6 and the electrode covering film 13 on the facing active matrix substrate 10a.

Subsequently, a polyimide resin (e.g., OPTMER AL produced by JSR Corporation) is applied on the entirety of the substrate over the rivets 21 by offset lithography, to form the alignment film 7.

<Liquid Crystal Display Device Fabricating Process>

First, a sealing material made of a thermosetting epoxy resin or the like is applied by screen deposition on either the active matrix substrate 10a or the counter substrate 20a into a frame pattern except a part serving as a port for introducing liquid crystal material, and spherical spacer having a diameter corresponding to the thickness of the liquid crystal layer 30 and made of a resin or silica is sprayed on the other substrate.

Subsequently, the active matrix substrate 10a and the counter substrate 20b are bonded to each other and the sealing material is hardened, to form a empty cell.

Next, a liquid crystal material made of the liquid crystal molecules 30a of which dielectric anisotropy is positive ($\Delta\epsilon<0$) is introduced by a reduced pressure method into the empty cell between the active matrix substrate 10a and the counter substrate 20b. Then, a UV curable resin is applied in the liquid crystal introducing port and the UV curable resin is cured by UV irradiation to seal the introducing port.

Embodiment 2

Figure 3:
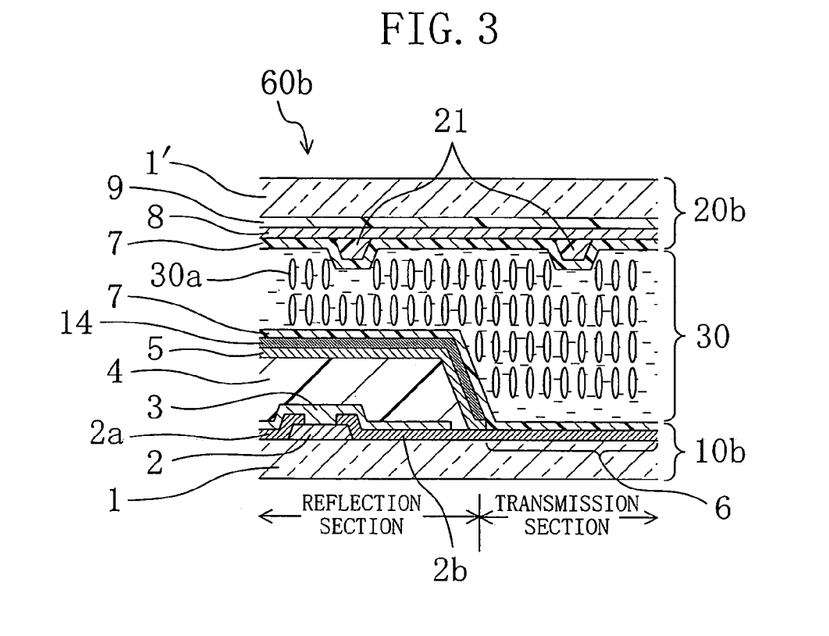
FIG. 3 is a schematic section of a semi transmissive type liquid crystal display device according to example Embodiment 2.

FIG. 3 shows a sectional construction of the semi transmissive type liquid crystal display device 60b according to example Embodiment 2. An active matrix substrate 10b of the semi transmissive type liquid crystal display device 60b has the same section as that of the active matrix substrate 10a shown in FIG. 2, and will be described with reference to FIG. 2.

The semi transmissive type liquid crystal display device 60b includes: the active matrix substrate 10b serving as a first substrate; a counter substrate 20b serving as a second substrate facing the active matrix substrate 10b; and a liquid crystal layer 30 interposed between the substrates 10b and 20b.

The active matrix substrate 10b has the same construction, from the insulating substrate 1 to the reflecting electrode 5, as that of the active matrix substrate 10a in Embodiment 1.

A reflecting electrode covering film 14 (comprised, for example, of the same transparent electrode material as that of a transparent electrode 6) is provided on the reflecting electrode 5 of the active matrix substrate 10b.

The reflecting electrode covering film 14 is comprised of a conductive transparent film and functions as applied voltage adjusting means for compensating for the difference in the work functions between the reflecting electrode 5 and the transparent electrode 6.

On the reflecting electrode covering film 14 and the transparent electrode 6, an alignment film 7 is provided.

The other construction is the same as that in Embodiment 1, and the same reference numerals are allotted to the same member for omitting detailed description thereof.

In the above semi transmissive type liquid crystal display device 60b, the reflecting electrode 5 and the transparent electrode 6 are comprised of different materials of which the work functions are different. However, the reflecting electrode covering film 14 comprised of the same transparent electrode material as that of the transparent electrode 6 is provided so as to cover the reflecting electrode 5 for compensating the difference in work function therebetween. Therefore, the optimum counter potential of the common electrode is equalized between in the reflection section and in the transmission section, thereby minimizing the difference in applied voltage therebetween. As a result, the liquid crystal molecules 30a are oriented uniformly between in the reflection section and in the transmission section and the transmittance of the respective pixels are equalized, thereby restraining roughness in a displayed image. The other effects are the same as those in Embodiment 1, and description thereof is omitted.

A fabricating method for the semi transmissive type liquid crystal display device 60b according to example Embodiment 2 will be described next in detail.

<Active Matrix Substrate Fabricating Process>

First, a metal film made of titanium or the like is formed on the entirety of the insulating substrate 1 of a glass substrate or the like by a sputtering method, and then, is patterned by the PEP technique to form the gate wires 11, the gate electrode and the capacitor wires 15.

Next, a silicon nitride film or the like is formed on the entirety of the substrate over the gate wires 11, the gate electrode and the capacitor wires 15 by a CVD method to form the gate insulating film.

Subsequently, an intrinsic amorphous silicon film and a $n^+$ amorphous silicon film in which phosphorus is doped are sequentially formed on the entirety of the substrate over the gate insulating film by a CVD method, and then, is patterned into an island shape on the gate electrodes by the PEP technique to form the semiconductor layer formed of the intrinsic amorphous layer and the $n^+$ amorphous silicon layer.

Next, a transparent conductive film made of an IZO film is formed by a sputtering method on the entirety of the substrate over the gate insulating film where the semiconductor layer is formed, and then, is patterned by the PEP technique to form the drain electrode 2b and the transparent electrode 6.

Subsequently, a metal film made of titanium or the like is formed by a sputtering method on the entirety of the substrate over the gate insulating film where the drain electrode 2b and the transparent electrode 6 are formed, and then, is patterned by the PEP technique to form the source wires 12 and the source electrode 2a.

Next, the $n^+$ amorphous silicon layer of the semiconductor layer is etched and removed using the source electrode 2a and the drain electrode 2b as a mask to form a channel portion.

Subsequently, a silicon nitride film or the like is formed on the entirety of the substrate over the source electrode 2a and the drain electrode 2b by a CVD method, and then, is patterned by the PEP technique to form the protection insulting film 3 that covers the TFT 2 composed of the gate electrode, the gate insulating film, the semiconductor layer, the source electrode 2a and the drain electrode 2b.

Next, a photosensitive acryl resin or the like is applied on the entirety of the substrate over the protection insulting film 3, and then, is patterned by the PEP technology to form the interlayer insulating film 4 so as to cover the protection insulating film 3.

The surface of the interlayer insulating film 4 may be rough by the PEP technique. In this association, the surface of the reflecting electrode 5 on the interlayer insulating film 4 becomes rough, with a result that light made incident into the reflecting electrode 5 can be appropriately scattered.

Subsequently, an aluminum film is formed on the entirety of the substrate over the interlayer insulting film 4 by a sputtering method, and then, is patterned by the PEP technique to form the reflecting electrode 5 so as to be laid over the TFT 2.

Next, a transparent conductive film made of an IZO film is formed on the entirety of the substrate over the reflecting electrode 5 by a sputtering method, and then, is patterned by the PEP technique to form the reflecting electrode covering film 14 so as to cover the reflecting electrode 5.

Subsequently, a polyimide resin (e.g., OPTMER AL produced by JSR Corporation) is applied on the entirety of the substrate over the reflecting electrode covering film 14 by offset lithography, to form the alignment film 7.

Thus, the active matrix substrate 10a is completed.

The counter substrate fabricating process and the liquid crystal display device fabricating process are the same as those in Embodiment 1 and the detailed description thereof is omitted.

Thereafter, the active matrix substrate 10b and the counter substrate 20b are bonded to each other and the same liquid crystal material as that in Embodiment 1 is introduced between the substrates 10b and 20b, thereby completing the semi transmissive type liquid crystal display device 60b of the present invention.

Working Example performed practically will be described next.

As Working Example, an experimental verification was conducted for clarifying the relationship between roughness in a displayed image and the difference in voltage applied to the liquid crystal layer between the reflection section and the transmission section. The experiment will be described in detail.

Figure 4:
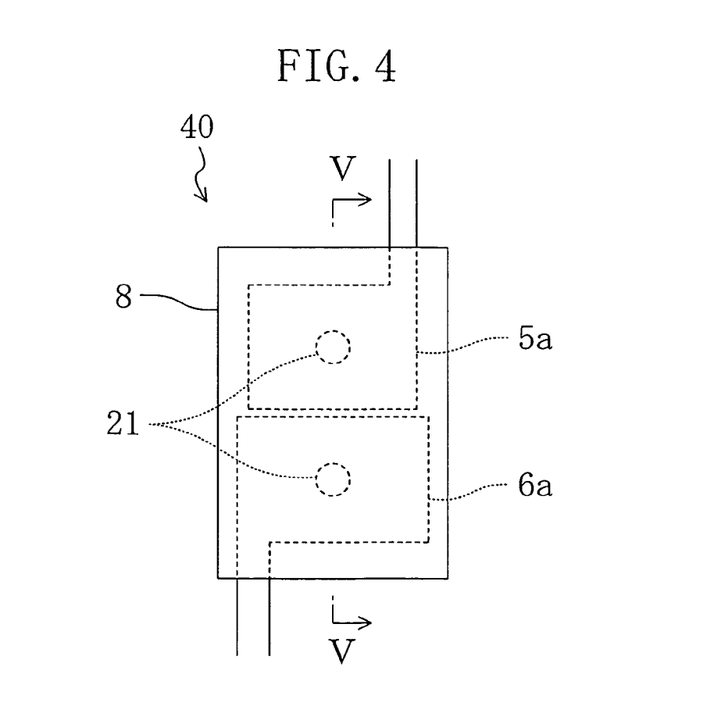
FIG. 4 is a schematic plan view of an experimental cell used in Working Example.
Figure 5:
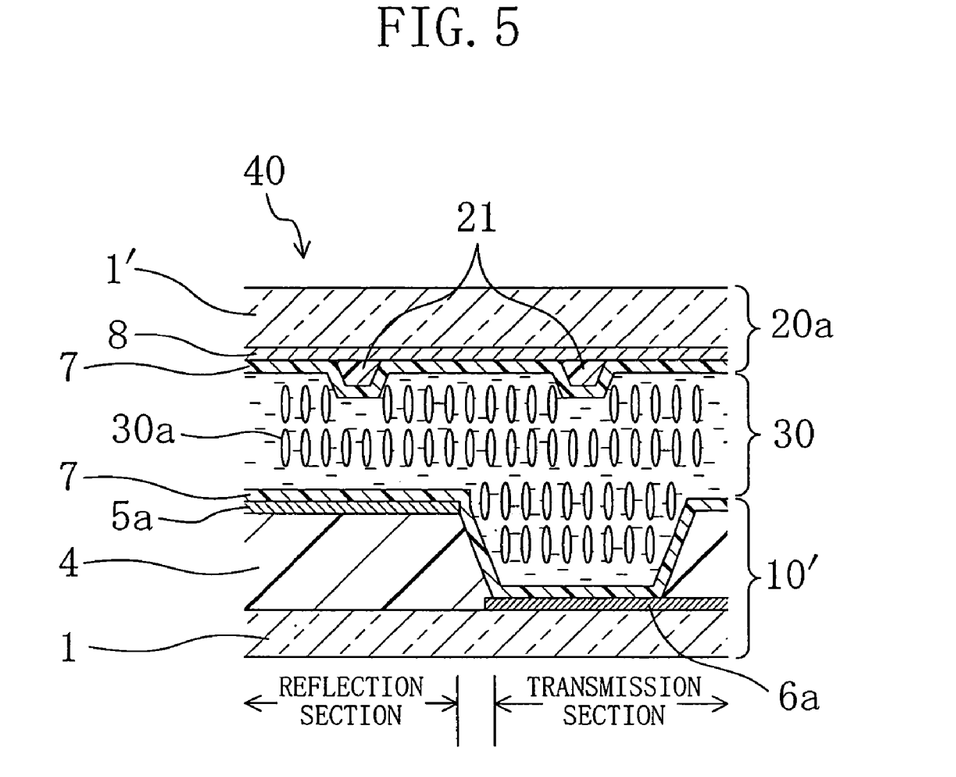
FIG. 5 is a schematic section taken along the line V-V in FIG. 4.

FIG. 4 is a schematic plan view of an experimental cell 40, which is a simplified model of the semi transmissive type liquid crystal display device, and FIG. 5 is a schematic section taken along V-V in FIG. 4.

The experimental cell 40 includes: a simplified array substrate 10'; a simplified counter substrate 20a; and a liquid crystal layer 30 interposed between the substrates 10' and 20a.

Referring to the simplified array substrate 10', a transparent electrode 6a comprised of ITO and a reflecting electrode 5a comprised of aluminum, with the interlayer insulating film 4 intervened, are provided on an insulating substrate 1 comprised of a glass substrate. Further, an alignment film 7 is provided so as to cover the reflecting electrode 5a and the transparent electrode 6a.

The reflecting electrode 5a and the transparent electrode 6a is electrically independent from each other and each has a lead wire for inputting a signal from outside. The reflecting electrode 5a and the transparent electrode 6a serve as the reflection section and the transmission section, respectively.

The reflecting electrode 5a is provided on the interlayer insulating film 4, so that a step portion is formed between the reflecting electrode 5a and the transparent electrode 6a. The reflecting electrode 5a and the transmission electrode 6a are 3 to 4 µm apart from each other to be electrically independent from each other as mentioned above, but the orientation of the liquid crystal molecules 30a in the step portion affects the orientation of the liquid crystal molecules 30a in the transmission section.

The interlaying insulating film 4 is comprised of an acryl resin and has a thickness to allow the liquid crystal layer 30 in the reflection section has a thickness substantially ½ of a thickness of the liquid crystal-layer 30 in the transmission section.

The alignment film 7 is made of a polyimide resin and orients liquid crystal molecules 30a (described later) substantially perpendicular to the substrate when no voltage is applied to the liquid crystal layer 30.

Referring to the simplified counter substrate 20a, the common electrode 8 made of ITO and an alignment film 7 are provided in this order on the insulating substrate 1' made of a glass substrate. Rivets 21 are provided between the common electrode 8 and the alignment film 7 so as to correspond respectively to the reflecting electrode 5a and the transparent electrode 6a on the simplified array substrate 10'. In this experiment, no color filter is provided because it is unnecessary.

The liquid crystal layer 30 is comprised of the liquid crystal molecules 30a which is nematic liquid crystal having an electooptic characteristic and of which dielectric anisotropy is negative ($\Delta\epsilon<0$).

The experimental cell 40 can be easily fabricated by following the semi transmissive type liquid crystal display device fabricating method described in Embodiment 1, and the description of the fabrication thereof is omitted.

A method of evaluating roughness in a displayed image, using the experimental cell 40 will be described next.

Figure 6A:
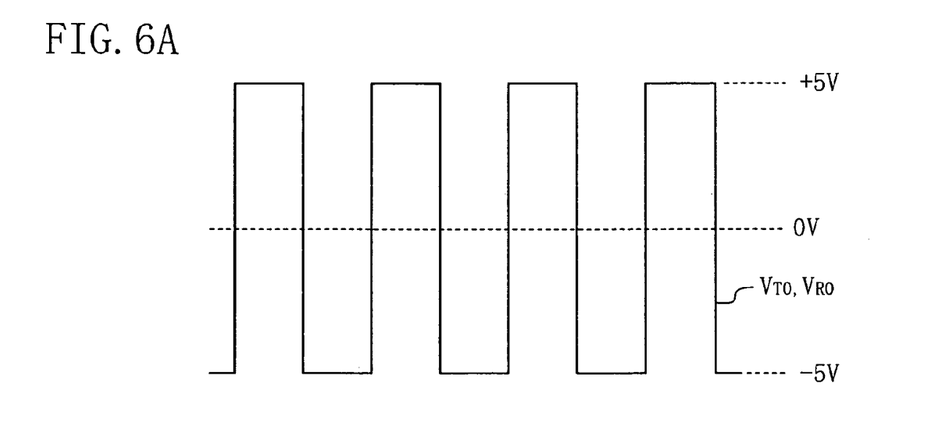
FIG. 6A through FIG. 6C are schematic drawings showing waveforms of input signals and applied voltages in Working Example.

First, signals $V_{R0}$ and $V_{T0}$ in a rectangular waveform of which potential is about ±5V as shown in FIG. 6A are input to the reflecting electrode 5a and the transparent electrode 6a, respectively, while inputting a signal of which potential is about 0V in DC to the common electrode 8.

Figure 6B:
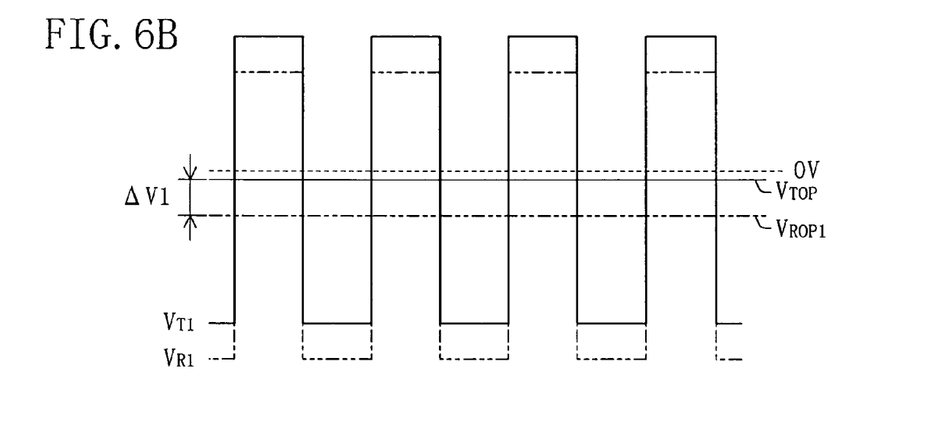

FIG. 6B shows waveforms of voltage applied to the liquid crystal layer 30 in the reflection section and the transmission section. $V_{R1}$ denotes the waveform of the applied voltage in the reflection section and $V_{T1}$ denotes the waveform of the applied voltage in the transmission section. As can be understood from FIG. 6B, even when the signals $V_{R0}$ and $V_{T0}$ having the same pattern are respectively input to the reflecting electrode 5a and the transparent electrode 6a, the voltage applied to the liquid crystal layer 30 is different between in the reflection section and in the transmission section because of the difference in work function of the electrodes and the difference in thickness of the liquid crystal layer 30 between in the reflection section and in the transmission section. For this reason, it is necessary to set the potential input to the common electrode 8 to be a reflection section optimum counter potential $V_{ROP1}$ in the reflection section and a transmission section optimum counter potential $V_{TOP}$ in the transmission section, respectively. Wherein, $\Delta_{V1}$ denotes the difference between the reflection section optimum counter potential $V_{ROP1}$ and the transmission section optimum counter potential $V_{TOP}$.

Therefore, the potential of the common electrode 8 is set first to the transmission section optimum counter potential $V_{TOP}$ for the transmission section so as not to cause flicker.

Figure 6C:
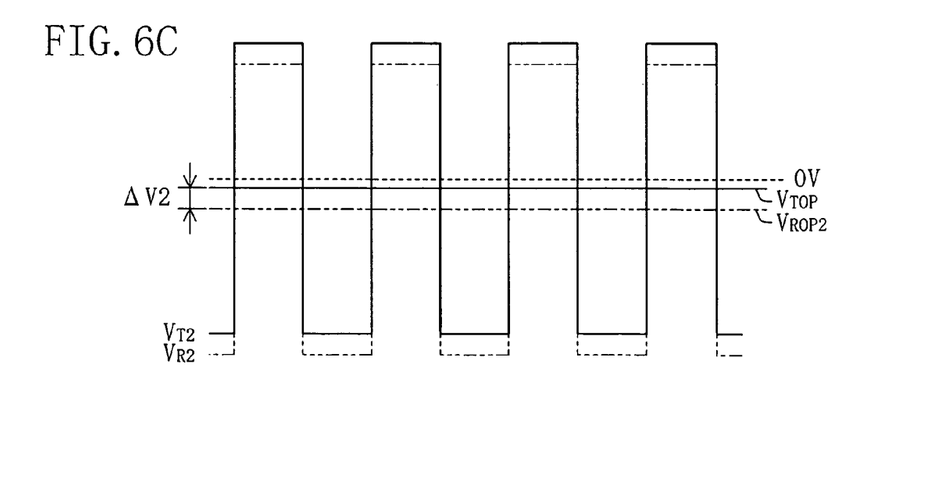

Then, a signal of a predetermined potential is added in DC to the reflecting electrode 5a. Whereby, the applied voltage in the reflection section is in a waveform $V_{R2}$ and the applied voltage in the transmission section is in a waveform $V_{T2}$, as shown in FIG. 6C. Also, a reflection section optimum counter potential $V_{ROP2}$ is approximated to the transmission section optimum counter potential $V_{TOP}$, so that the difference $\Delta 2$ between the reflection section optimum counter potential $V_{ROP2}$ and the transmission section optimum counter potential $V_{TOP}$ becomes smaller than the difference $\Delta 1$ between the reflection section optimum counter potential $V_{ROP1}$ and the transmission section optimum counter potential $V_{TOP}$.

By adding the predetermined potential to the reflecting electrode 5a in this way, the voltage applied to the liquid crystal layer 30 between the reflecting electrode 5a and the common electrode 8 in the reflection section is adjusted.

Thereafter, the experimental cell 40 is sandwiched between two polarizing plates and roughness in a displayed image is observed while changing the added predetermined potential gradually.

Next, roughness in a displayed image where the predetermined potential is changed using the aforementioned method will be described with reference to Table 1.

TABLE 1

| Applied voltage difference | Roughness in displayed image |
|---|---|
| 900 mV | Present |
| 500 mV | Present |
| 350 mV | Present a little |
| 300 mV | Not present |
| 0 V | Not present |

When the predetermined potential was 0V, the difference (applied voltage difference) between the voltage applied to the liquid crystal layer 30 by the reflecting electrode 5 in the reflection section and the voltage applied to the liquid crystal layer 30 by the transparent electrode 6a in the transmission section was 900 mV and roughness was observed in a displayed image. The applied voltage difference herein means difference of optimum counter potentials between in the reflection section and in the transmission section.

When the predetermined potential was raised to 300 mV, the applied voltage difference becomes 350 mV and roughness was less observed in a displayed image.

When the predetermined potential was further raised to 500 mV, the applied voltage difference becomes 300 mV and no roughness was observed by viewing in a displayed image.

Further, when the predetermined potential was raised to 900 mV, the applied voltage difference becomes 0 V and no roughness was observed by viewing in a displayed image.

As described above, the semi transmissive type liquid crystal display device in the present invention minimizes the difference in voltage applied to the liquid crystal layer between in the reflection section and in the transmission section, and therefore, is useful in application to semi transmissive type liquid crystal display devices of homeotropic orientation type using liquid crystal molecules of which dielectric anisotropy is negative ($\Delta\epsilon<0$), which is liable to cause orientation turbulence of the liquid crystal molecules due to slight variation of the applied voltage.

What is claimed is:

1. A liquid crystal display device, comprising:
a first substrate and a second substrate which face each other;
a liquid crystal layer which is interposed between the first substrate and second substrate and which is comprised of liquid crystal molecules; and
a plurality of pixels each comprised of a reflection section configured to perform display in a reflection mode and a transmission section configured to perform display in a transmission mode,
wherein in the first substrate, a reflecting electrode for applying voltage to the liquid crystal layer in the reflection section and a transparent electrode for applying voltage to the liquid crystal layer in the transmission section are provided, the transparent electrode being connected with the reflecting electrode electrically,
in the second substrate, a common electrode is provided so as to face the first substrate,
in the liquid crystal layer in each of the pixels, the liquid crystal molecules are oriented substantially perpendicularly to planes of the substrates when no voltage is applied to the liquid crystal layer,
applied voltage adjusting means configured whereby voltage applied to the liquid crystal layer in the reflection section approximates voltage applied to the liquid crystal layer in the transmission section, and
wherein a step portion is formed in a boundary region between the reflection section and the transmission section.

2. The liquid crystal display device of claim 1, wherein the applied voltage adjusting means comprises a transparent conductive film that covers at least the reflecting electrode.

3. The liquid crystal display device of claim 2, wherein the applied voltage adjusting means covers the transparent electrode.

4. The liquid crystal display device of claim 1, wherein a difference between the voltage applied to the liquid crystal layer in the reflection section and the voltage applied to the liquid crystal display layer in the transmission section is 300 mV or lower.

5. The liquid crystal display device of claim 1, wherein the reflection section and the transmission section are driven by an alternating current (AC) signal.

6. The liquid crystal display device of claim 1, wherein the reflecting electrode is electrically connected with the transparent electrode through the step portion.

7. The liquid crystal display device of claim 6, wherein a thickness of the liquid crystal layer in the reflection section except the step portion is different from a thickness of the liquid crystal layer in the transmission section.

8. The liquid crystal display device of claim 7, wherein the thickness of the liquid crystal layer in the reflection section except the step portion is substantially ½ of the thickness of the liquid crystal layer in the transmission section.

9. The liquid crystal display device of claim 1, wherein white display is performed by orienting the liquid crystal molecules substantially in parallel with planes of the substrates when voltage is applied to the liquid crystal layer.

10. The liquid crystal display device of claim 1, wherein white display is performed by orienting the liquid crystal molecules radially when voltage is applied to the liquid crystal layer.

11. The liquid crystal display device of claim 1, wherein the applied voltage adjusting means comprises a transparent conductive film configured to cover at least the reflecting electrode and configured to compensate for difference in a work function between the reflecting electrode and the transparent electrode.

12. The liquid crystal display device of claim 1, further comprising rivets comprising the second substrate and configured to form an orientation center in the transmission section and an orientation center in the reflection section in a voltage applied state.

13. The liquid crystal display device of claim 1, wherein the rivets are configured whereby, when no voltage is applied to the liquid crystal layer, liquid crystal molecules in a vicinity of the rivets are oriented and tilted radially with the rivets as centers and other liquid crystal molecules apart from the rivets are oriented substantially perpendicularly to a plane of the substrate, and whereby, when voltage is applied to the liquid crystal layer, the liquid crystal molecules apart from the rivets are also oriented and tilted in the radial direction so as to match the liquid crystal molecules in the vicinity of the rivets.

14. The liquid crystal display device of claim 1, wherein the applied voltage adjusting means is configured whereby an optimum counter potential of the common electrode is substantially equalized between in the reflection section and the transmission section.

15. The liquid crystal display device of claim 1, wherein the applied voltage adjusting means comprises a transparent conductive film that is distinct from the reflecting electrode and the transparent electrode.

* * * * *